Sept. 8, 1936. W. B. WHITSITT 2,053,983
DRIVE GEARING FOR AXLE GENERATORS
Filed Jan. 2, 1932 4 Sheets-Sheet 3

Sept. 8, 1936.　　　W. B. WHITSITT　　　2,053,983
DRIVE GEARING FOR AXLE GENERATORS
Filed Jan. 2, 1932　　　4 Sheets-Sheet 4

Inventor
William B Whitsitt
By
Attorney

Patented Sept. 8, 1936

2,053,983

UNITED STATES PATENT OFFICE 2,053,983

DRIVE GEARING FOR AXLE GENERATORS

William B. Whitsitt, Baltimore, Md.

Application January 2, 1932, Serial No. 584,479

35 Claims. (Cl. 105—101)

This invention relates to drive gearing for axle generators such as are used on railway cars for transmitting driving power from a car axle to a generator supplying electric current for the operation of the car cooling and/or the lighting system, small ventilating fans, etc., of the car. At the present time the general method employed for driving the electric generator used in connection with railway passenger cars for the purpose described is to mount the generator in some kind of a swinging arrangement in relation to the car underframe and to drive this generator through a single belt, one belt pulley being attached directly to the car axle and the other to the generator.

A drive of this type is limited in that since a single belt is used the maximum ratio of pulleys can only be approximately 2¼ to 1, so that, using 36" diameter passenger car wheels at a speed of 70 miles per hour, the generator revolves at a speed of only 1470 revolutions, which, with the usual size generator used, limits the capacity to about 4 kw. maximum. Also, since it is necessary for the generator to be revolved at a speed of approximately 450 revolutions in order to begin generating current, the generator does not become available for use until the train speed has reached about 21 miles per hour.

In order to overcome the limitations of the ordinary single ratio belt drive, numerous direct gear drives have been developed wherein the generator is directly connected by a series of gears with a gear mounted on one of the car axles. These arrangements are difficult to keep in operating condition and require high grade and expensive workmanship in order to properly and centrally mount the gear on the axle. When excessive shocks are imparted to the car because of the rigid connection between the car axle and the generator armature, the inertia of the armature, gears, etc., is so great that often teeth are sheared from the driving gears. The space limitations available at the center of the car axle are such that with the direct driving gear arrangements in use the greatest maximum gear ratio obtained is in the neighborhood of 2¾ to 1, so that the speed of the generator in relation to the speed of the car wheel is limited to about the same extent as with the belt-driven body-hung generator.

The present invention is designed to overcome these difficulties and objections to the prior structures.

One object of the present invention is to provide a generator drive which allows any desired generator speed to be obtained, while allowing sufficient slip to overcome the inertia of the gears and generator armature, in case of excessive shocks, whereby damage to the drive gearing will be prevented.

A further object of the invention is to provide a novel combined belt-and-gear-driven generator drive of the character and for the purpose above set forth.

A still further object of the invention is to provide a combination belt-and-gear-driven generator drive which allows ratio changes, either in the primary belt drive or in the driven gearing, whereby any desired ratio of generator speed to car axle speed may be obtained in a simple, reliable and efficient manner.

A still further object of the invention is to provide a drive gearing of the character described which freely accommodates itself to and permits swiveling and other relative movements between the wheel truck carrying the generator drive axle and the car underframe on which the generator is mounted, so that a smooth working action of the generator drive is obtained and liability of damage to the working parts prevented.

A still further object of the invention is to provide a generator drive gearing which allows the rigid transverse mounting of the generator on the car underframe, together with the driven parts of the transmission gearing, in such manner as to enable a larger sized generator to be used.

A still further object of the invention is to provide a construction of drive gearing and generator of such size and operating at such speed as to provide current not only sufficient for operating the lighting system and ventilation fans of the car, but also operating air conditioning or other equipment beyond the capacity of the usual generator, and which in addition will adapt the generator to begin functioning at a low speed, approximately 8 to 10 miles per hour, of the car.

With these and other objects in view, as will appear in the course of the subjoined description, the invention consists of the features of construction, combination and arrangement of parts, hereinafter fully described and claimed, reference being had to the accompanying drawings, in which:—

Figure 1:
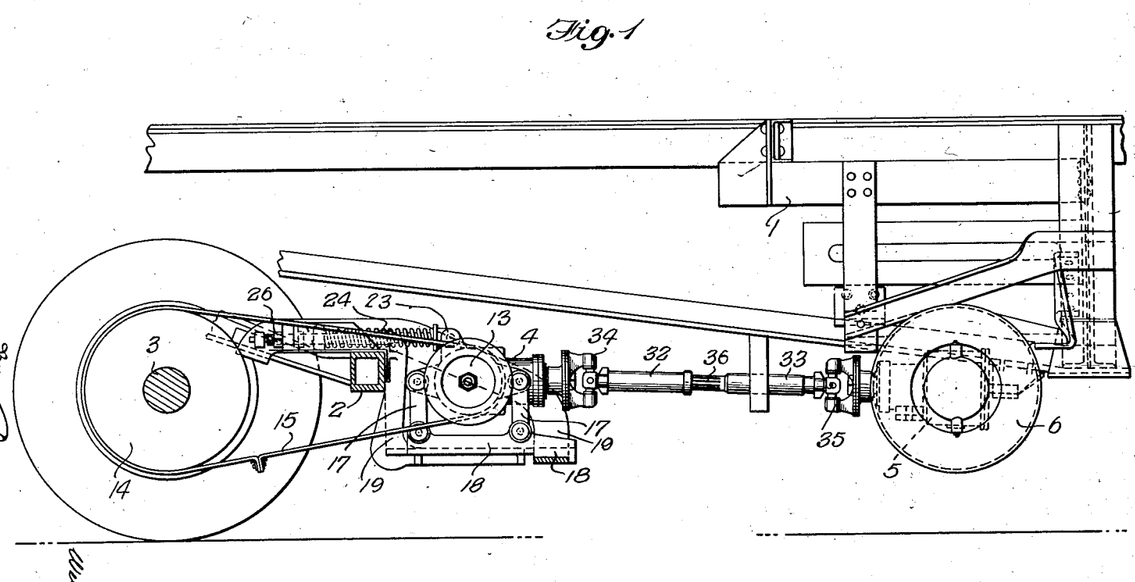
Fig. 1 is a side elevation, partially in section, showing the application of my novel driving means to an axle generator, a part of a wheel truck frame and a part of the car underframe being disclosed.
Figure 2:
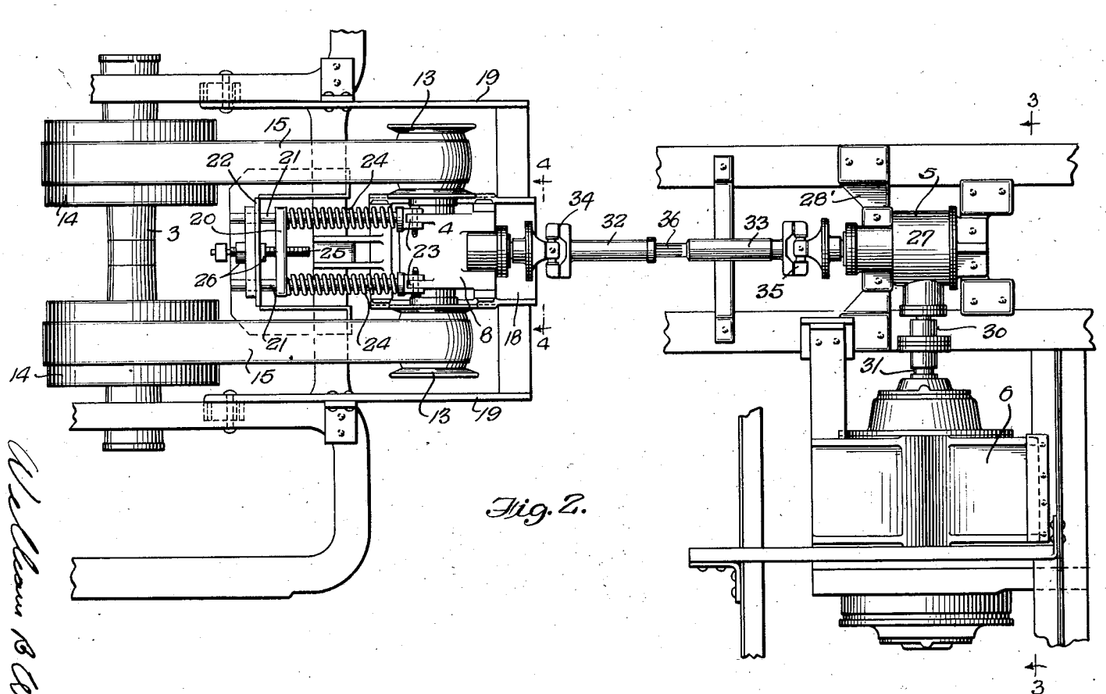
Fig. 2 is a top plan view of the same.
Figure 3:
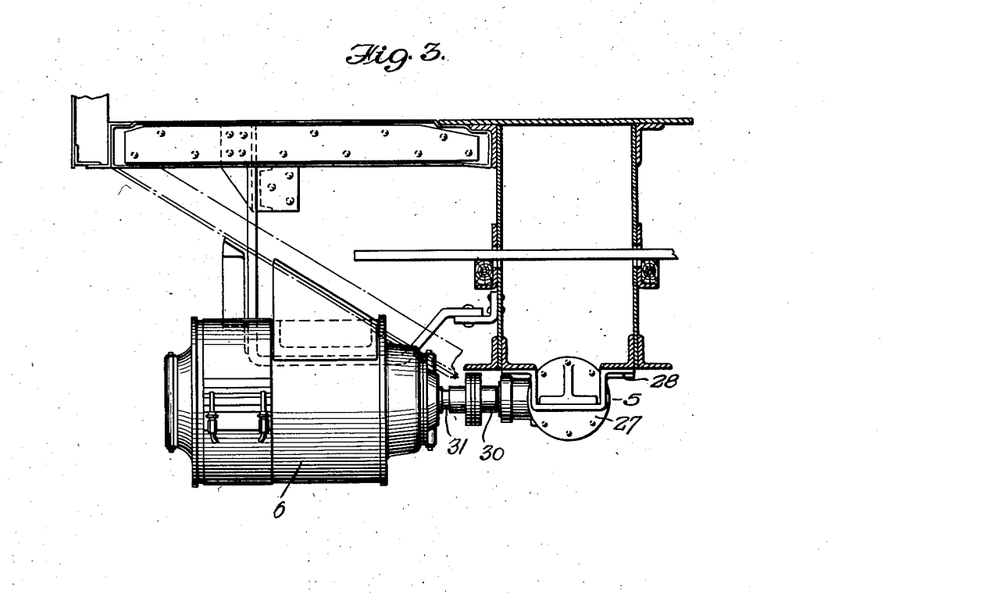
Fig. 3 is a section taken substantially on line 3—3 of Fig. 2.
Figure 4:
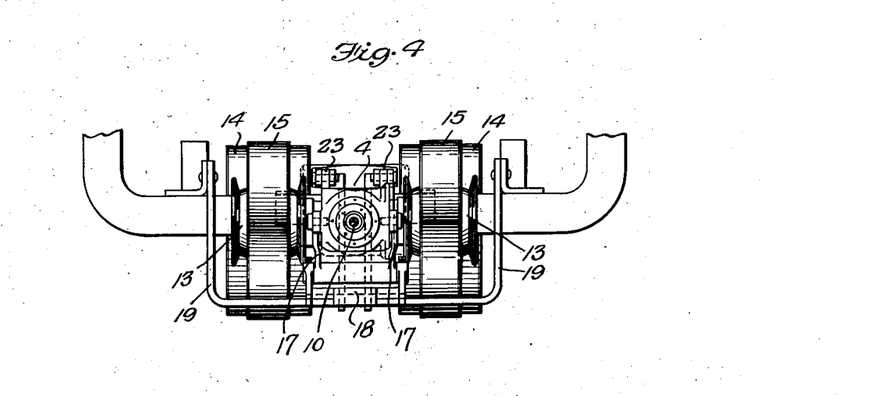
Fig. 4 is a sectional end elevation of the driving unit part of the mechanism, taken substantially on line 4—4 of Fig. 2.
Figure 5:
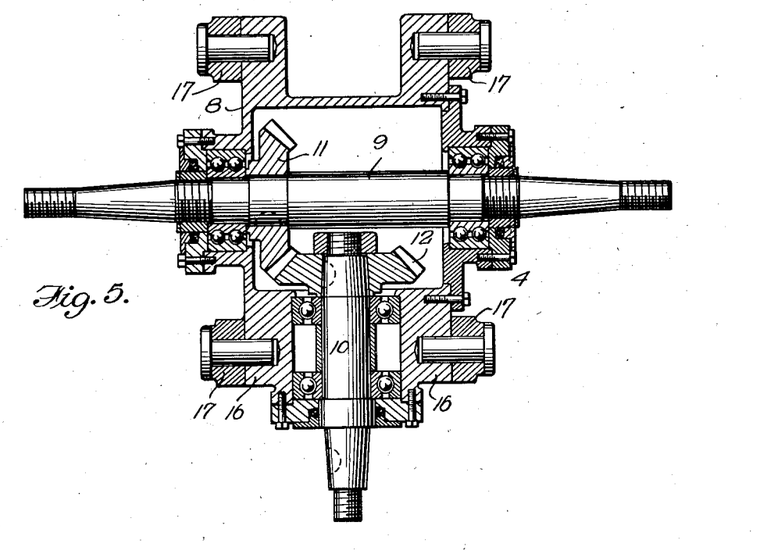
Fig. 5 is a section through the driving gearing of the driving unit.
Figure 6:
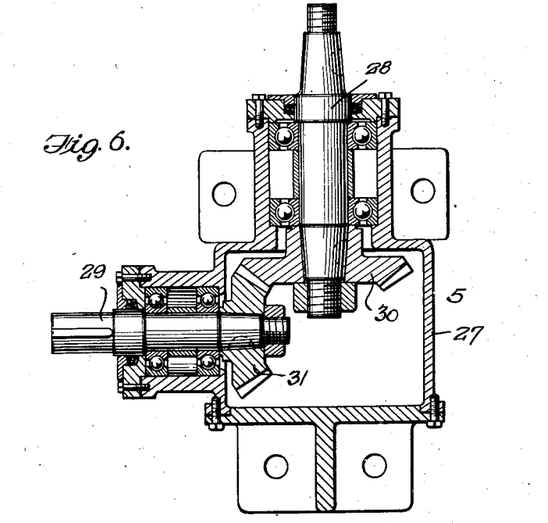
Fig. 6 is a section through the gearing of the driven unit.

Referring now more particularly to the drawings, 1 designates a part of the underframe of a railway passenger car, 2 a part of one of the truck frames, and 3 one of the wheel axles journaled upon said truck frame. In accordance with my invention, I provide a generator driving gear comprising a driving unit 4, a driven unit 5 for transmitting motion to the shaft or armature of the generator 6, and a transmission unit or shaft disposed between and connecting the gear units for transmitting motion from one to the other.

The driving unit 4 comprises a gear box or casing 8 having journaled therein a transverse drive shaft 9 and a longitudinally extending intermediate shaft 10 driven thereby through bevel gears 11 and 12 on said shafts. The ends of the shaft 9 extend beyond the sides of the casing 8 and have mounted thereon small drums or pulleys 13 connected to a drum or single pulley or a pair of pulleys 14 on the axle 3, as shown, by belts 15, whereby in the rotation of the axle 3 the shaft 9 is driven. This double drive-belt arrangement ensures transmission of driving action to the driving unit from the axle in a balanced manner and without side pull or strain, and also an arrangement whereby the ratio between the drum or pulleys 14 and the pulleys 13 may be varied at will to change the rate of speed of the shaft 9 with respect to that of the axle 3.

The casing 8 is provided at front and rear with pairs of ears 16, to which are pivotally connected the upper ends of supporting links 17, which are pivotally connected at their lower ends to the bed plate 18 of a carrier frame 19 mounted on the truck frame 2. These links form a swinging support or cradle adapting the gear unit 4 to have movement longitudinally of the car to compensate for distance variations between the driving and driven units and to maintain a proper tension on the belts 15. This compensating movement of the links and drive gear units is yieldingly restrained or restricted by a spring tension device comprising a yoke frame formed of a cross bar 20 and guide rods 21 slidably passing therethrough and through a fixed yoke frame 22 on the truck frame, said rods being pivotally connected at their forward ends to ears 23 on the casing 8 and springs 24 being mounted on said rods between their pivoted ends and the cross bar 20 to maintain a desired tension on or tautness of the belts 15 and to yieldingly resist and absorb shocks in a direction causing loosening of the belts. The tension of these springs may be regulated by means of an adjusting screw 25 in threaded engagement with the bar 20 and journaled on the yoke 22 and adapted to be held in adjusted position by check nuts 26.

This double tension spring arrangement in which the tension springs are disposed on opposite sides of the longitudinal center line of the driving unit ensures a uniform or balanced tension on the belts 15, as will be readily understood.

The driven unit 5 is arranged in longitudinal alignment with the drive unit 4 and comprises a casing 27 rigidly mounted, as at 28', on the car underframe. In this casing are journaled a longitudinally extending main driven shaft 28 and a transversely extending shaft 29 driven thereby through interposed bevel gears 30 and 31, gear 30 being of a suitably larger diameter than gear 31, when desired, so that the ratio of generator speed to car axle speed may be varied by the use of proper driven gears in the driven unit as well as by variation in the diameters of the pulleys or drums on the drive shaft and car axle. The shaft 30 is directly connected, as shown, to the shaft or armature of the generator 6, which is rigidly mounted on the car underframe parallel with the axle 3 and at right angles to the intermediate drive gearing.

The driving motion of the driving unit 4 is transmitted to the driven unit 5 through the transmission unit 7 comprising an interposed longitudinally extending sectional transmission shaft comprising longitudinally alined shaft members 32 and 33 which are respectively connected at one end to the shafts 10 and 28 by universal joints 34 and 35 and are feathered for rotation in unison and sliding connection at their opposite ends, as indicated at 36, said feathered ends of the shaft being telescopically connected so that the transmission shaft is longitudinally expansible and contractible within given limits. The universal joints 34 and 35 adapt the driving and driven gear units to have independent relative or conjoint lateral and vertical angular movements to compensate for and allow the same to move with the truck in its up and down and swiveling movements, while the telescopic connection allows the transmission shaft to lengthen and shorten so as to compensate for variations in such swiveling movements between the gear units, thus maintaining the working relationship of the parts of the generator driving mechanism without throwing strain thereon in the independent movements of the car frame and truck and without interfering with such movements.

In the operation of the device it will be seen that in the rotation of the axle 3 the shaft 9 will be driven by means of the belts 15 and will in turn transmit motion to shaft 10 through the bevel gears 11 and 12; that shaft 10 will communicate motion through the transmission shaft 32—33 to the shaft 28 of the driven unit which in turn will operate through bevel gears 30 and 31 to drive shaft 29 connected with the generator shaft or armature 31, whereby the generator is operated at a given speed with relation to the car axle speed; and that in the travel of the car a smooth driving action will be maintained by reason of the universal joints 34 and 35 and the telescopic connection at 36 between the shaft elements 32 and 33. The gears 11 and 12, as stated, may be of the same diameter so as to maintain a given driving action between the same and the transmission shaft, but it will be obvious that the speed ratio of the generator with respect to that of the axle may be varied by simply altering the relative diameters of the drums or pulleys 13 and 14 or the gears 30 and 31 or both. In practice the drums or pulleys 14 may be 20" in diameter and the pulleys 13, 8" in diameter, and the gears 30 and 31 may have a 3 to 2 ratio, so as to make the total generator speed to car axle speed 3¾ to 1, adapting the generator to be operated at relatively high speed in relation to the car axle, so that the generator can be made to begin functioning at a car speed of from 8 to 10 miles per hour, instead of 20 or more miles per hour, as now required. This speed may be increased if desired by comparing the gear ratios of the pulleys or driven gears, or both, as will be readily understood, and most conveniently a change of driving speed may be made by simply substituting pulleys 13 of larger or smaller diameter for those in use to reduce or increase the speed to the desired degree.

Because of the several steps in the gear train and pulley arrangement it is evident that it is easily possible at small expense to design and maintain on hand a number of arrangements of gears and pulleys which can be conveniently installed if desired to give any generator speed necessary, and, since the drive gear unit is mounted on the truck frame in definite relationship to the car axle, the relationship between the pulleys on the car axle and drive shaft of the drive unit will always be the same, regardless of any curve traveled by the car, such curve variations being taken up by the universal joints and the expansible shaft so that it is possible to rigidly mount the generator on the car body or car body underframe through the compensating action secured by the structure described. The described construction of the drive gearing also makes it possible to elevate the generator to a higher point than before and to mount it transversely on the car underframe, so that a larger generator may be used than was permissible under the ordinary practice of mounting the generator frame under and longitudinally of the car center frame, so that a generator operating at low car speeds and having an output of from 8 to 10 kw. maximum may be employed, giving ample current not only for lighting purposes and driving ventilating fans, but also for operating air conditioning, cooling or other appliances.

It will be seen that the present invention provides a generator drive which is divided into several units, so that the internal stresses in each unit are reduced to a suitable workable basis, and by increasing the speed of the different units their size can be necessarily reduced, allowing them to be placed in a limited space available under the car, and making it possible to drive a larger generator and to effect the functioning of the generator at a lower car speed than has been possible heretofore, so that a large and reliable output at different car speeds may be obtained for the various purposes described. By the division of the drive into several units and employing a combination belt and gear drive, a great advantage over prior driving devices is obtained in that, since there is no rigid connection between the driving gears and the car axle, sudden jolts, shocks or jars or impacts against the car will not result in the shearing of any of the gear teeth or breaking of any parts, since the drive belts will slip sufficiently to overcome the inertia of the gears and generator armature, thus compensating for all shocks so as to prevent damage to any other working parts.

From the foregoing description, taken in connection with the accompanying drawings, the construction, mode of operation and advantages of my improved generator driving mechanism will be readily understood and appreciated by those versed in the art without a further and extended description. While the structure disclosed for purposes of exemplification is preferred, it will, of course, be understood that changes in the form, proportion and details of construction and working arrangement of the operating parts may be varied as desired within the scope of the appended claims, without departing from the spirit or sacrificing any of the advantages of the invention.

What I claim is:—

1. In a driving means for car axle driven generators, and in combination with a car underframe and a wheel truck and an axle mounted on the truck, a drive gear unit embodying geared primary and secondary shafts, a pivotal support bodily mounting said unit on the wheel truck for movement in a substantially horizontal plane, a tension device connected to the truck frame and to the drive gear unit, a balanced double belt drive connection between the axle and the primary shaft of said unit, a generator mounted on the underframe, a driven gear unit embodying geared primary and secondary shafts, the latter directly coupled to the generator, and a drive connection between the secondary shaft of the drive unit and primary shaft of the driven unit.

2. In a driving means for car axle driven generators, and in combination with a car underframe and a wheel truck and an axle mounted on the truck, a drive gear unit embodying geared primary and secondary shafts, means supporting said unit on the wheel truck for shifting movements longitudinally of the car, a tension device connected to the truck frame and to the drive gear unit, a balanced double belt drive connection between the axle and the primary shaft of said unit, a generator mounted on the underframe, a driven gear unit embodying geared primary and secondary shafts, the latter directly coupled to the generator, and a transmission shaft comprising telescopically coupled sections respectively connected to the secondary shaft of the drive unit and primary shaft of the driven unit.

3. In a driving means for car axle driven generators, and in combination with a car underframe and a wheel truck and an axle mounted on the truck, a drive gear unit mounted on the truck and embodying geared primary and secondary shafts, a balanced double belt drive connection between the axle and the primary shaft of said unit, a generator mounted on the underframe, a driven gear unit embodying geared primary and secondary shafts, the latter directly coupled to the generator, means supporting said drive gear unit on the wheel truck for shifting movements longitudinally of the car, a tension device connected to the truck frame and the drive gear unit and acting on the drive unit to control its shifting movements, and a drive connection between the secondary shaft of the drive unit and primary shaft of the driven unit.

4. In a driving means for car axle driven generators, and in combination with a car underframe and a wheel truck and an axle mounted on the truck, a drive gear unit embodying geared primary and secondary shafts, a balanced double belt drive connection between the axle and the primary shaft of said unit, a generator mounted on the underframe, a driven gear unit embodying geared primary and secondary shafts, the latter directly coupled to the generator, means supporting said drive gear unit on the wheel truck for shifting movements longitudinally of the car, a tension device connected to the truck frame and to the drive gear unit acting on the drive unit to control its shifting movements, and a transmission shaft comprising telescopically coupled sections respectively connected to the secondary shaft of the drive unit and primary shaft of the driven unit.

5. In a driving means for car axle driven generators, and in combination with a car underframe and a wheel truck and an axle mounted on the truck, a drive gear unit embodying geared primary and secondary shafts, a support bodily mounting said unit on the wheel truck for movement in a substantially horizontal plane, a tension device connected to the truck frame and to said drive gear unit, a balanced double belt drive connection between the axle and the primary shaft of said unit, a generator mounted on the underframe, a driven gear unit embodying geared primary and secondary shafts, the latter directly coupled to the generator, and a drive connection between the secondary shaft of the drive unit and primary shaft of the driven unit.

6. In driving means for axle driven generators, and in combination with a car underframe, a wheel truck having an end sill, and an axle mounted on the truck, a drive unit including a casing having journaled therein geared primary and secondary drive shafts, the former extending transversely of the car and the latter longitudinally of the car, said primary drive shaft having its end portions projecting beyond opposite sides of the casing, a support for said drive unit suspended from the end sill of the truck so as to lie in a horizontal plane below the same, pivotal means between the support and casing, a tension device acting on said drive unit, a balanced plural belt drive connection between the axle and said projecting end portions of the primary drive shaft, a driven shaft, a transmission shaft comprising telescopically connected sections coupled to the driving and driven shafts, and a drive connection between the driven shaft and generator.

7. In a driving mechanism of the character described and in combination with a car underframe and a wheel truck having an end sill, and an axle mounted on the truck, a drive gear unit embodying geared primary and secondary shafts, a support carried by and disposed in a horizontal plane below the end sill of the truck, front and rear pairs of links at opposite sides of and pivotally connecting said drive gear unit with the support to swing on a horizontal transverse axis longitudinally of the car, a tension device connected to the truck frame and to the drive gear unit above the plane of said support, a balanced double drive belt connection between the axle and primary shaft of the drive gear unit, a generator mounted on the car underframe, a driven unit connected to the generator, and a transmission connection between said driven unit and the second shaft of the primary unit.

8. In a driving mechanism of the character described and in combination with a car underframe and a wheel truck having an end sill, and an axle mounted on the truck, a drive unit embodying geared drive elements, a support for said unit carried by and arranged below the horizontal plane of the end sill, means mounting said unit on the support to swing on a horizontal transverse axis longitudinally of the car, a tension device connected to the truck frame and to the drive gear unit above the plane of the support, a balanced double drive belt connection between the axle and geared drive elements of the drive unit, a generator mounted on the car under frame, a driven shaft positively geared to the generator, and a flexible longitudinally extensible transmission shaft universally jointed to the drive shaft and the geared elements of the drive unit.

9. In a driving mechanism of the character described, and in combination with a car underframe and a wheel truck having an end sill, and an axle mounted on the truck, a drive gear unit embodying geared primary and secondary drive shafts, a support for said drive gear unit carried by and arranged below the horizontal plane of the sill, means mounting said unit on the support to swing on a horizontal transverse axis longitudinally of the car, a tension device connected to the truck frame and to the drive gear unit above the plane of the support, a balanced plural belt drive connection between the axle and primary drive shaft, a driven shaft, a generator supported on the car underframe and driven from the driven shaft, and a transmission shaft between the secondary drive shaft and the driven shaft.

10. In driving means for car axle driven generators, and in combination with a car underframe and a wheel truck having an end sill, and an axle mounted on the truck, a generator mounted on the car underframe, a drive shaft, a support for said drive shaft carried by and arranged below the horizontal plane of the end sill, a link connection pivotally mounting the drive shaft from the support to swing on a horizontal transverse axis longitudinally of the car, a tension device connected to the truck frame and to the drive gear unit above the plane of the support, a belt and gear drive connection between said shaft and the axle, a driven shaft arranged at right angles to the drive shaft and coupled to the generator, and a flexible longitudinally extensible transmission shaft directly coupled to the drive shaft and in gear with the driven shaft.

11. In driving means for car axle driven generators, and in combination with a car underframe and a wheel truck having an end sill, and an axle mounted on the truck, a generator mounted on the car underframe, a drive gear unit embodying geared primary and secondary drive shafts, a support carried by and arranged below the horizontal plane of the end sill, a link connection pivotally mounting the gear unit on the support to swing on a horizontal transverse axis longitudinally of the car, a tension device connected to the truck frame and to the drive gear unit above the plane of the support, a balanced plural belt drive connection between the primary drive shaft and the axle, a driven shaft coupled to the generator, and a transmission shaft coupled to the secondary drive shaft of the driving unit and to the driven shaft coupled to the generator.

12. In a driving means for car axle driven generators, and in combination with a car underframe, a wheel truck having an end sill, and an axle mounted on the truck, a support mounted on the truck and disposed below the horizontal plane of said end sill, a drive gear unit mounted on the support for shifting movements longitudinally of the car, a tension device connected to the truck frame and to the drive gear unit above the plane of the support and acting on said unit to control its shifting movements, said drive unit embodying geared elements, a balanced non-rigid double drive connection between the axle and geared elements of the drive unit having capability of a compensating movement under car shocks and jars and the inertia of the gear elements and generator armature to prevent injury thereto by such shocks and jars and inertia actions, a generator mounted on the underframe transversely of the car, a driven unit directly coupled to the generator and embodying geared elements, and a flexible driving connection between the driving and driven units.

13. In a driving means for car axle driven generators, and in combination with a car underframe, a wheel truck having an end sill, and an axle mounted on the truck, a support mounted on the truck and disposed below the horizontal plane of said end sill, a drive gear unit mounted on the support for shifting movements longitudinally of the car, a tension device connected to the truck frame and to the drive gear unit above the plane of the support and acting on said drive unit to control its shifting movement, said drive unit embodying geared elements, a balanced double non-rigid drive connection between the axle and geared elements of the drive unit having capability of a compensating movement under car shocks and jars and the inertia of the gear elements and generator armature to prevent injury thereto by such shocks and jars and inertia actions, a generator mounted on the underframe transversely of the car, a driven unit directly coupled to the generator and embodying geared elements, and a flexible driving connection between the driving and driven units and comprising a shaft embodying sections telescopically connected to each other and universally jointed to the geared elements of the driving and driven units.

14. In a driving means for car axle driven generators, and in combination with a car underframe and a wheel truck having an end sill and an axle mounted on the truck, a support on the truck disposed below the horizontal plane of the end sill, a drive gear unit, means between and mounting the drive gear unit on the support to move longitudinally of the car, a tension device connected to the truck frame and to said drive gear unit above the horizontal plane of said support and mounting means, said drive unit embodying geared elements, a drive connection between the axle and drive unit, a generator mounted on the underframe transversely of the car, a driven unit embodying geared driven and driving elements, a driving connection between the driving element of the driven unit and the generator, and a flexible driving connection between the driving and driven units and comprising a shaft embodying sections telescopically connected to each other and universally jointed to the driven element of the geared elements of the driving and driven units.

15. In a driving means for car axle driven generators, and in combination with a car underframe and a wheel truck and an axle mounted on the truck, a drive gear unit bodily supported on the wheel truck for movements in a substantially horizontal plane and embodying geared primary and secondary shafts, a tension device connected to said unit and to the truck frame, a balanced double belt drive connection between the axle and the primary shaft of said unit, a generator mounted upon the car underframe, a driven gear unit embodying geared primary and secondary shafts, the latter directly coupled to the generator, and a drive connection between the secondary shaft of the drive unit and primary shaft of the driven unit.

16. In a driving means for car axle driven generators, and in combination with a car underframe and a wheel truck and an axle mounted on the truck, a drive gear unit bodily supported on the wheel truck for movement in a substantially horizontal plane and embodying geared primary and secondary shafts, a tension device connected to said unit and to the truck frame, a balanced double belt drive connection between the axle and the primary shaft of said unit, a generator mounted on the car underframe, a driven gear unit embodying geared primary and secondary shafts, the latter directly coupled to the generator, and a transmission shaft comprising telescopically coupled sections respectively connected to the secondary shaft of the drive unit and primary shaft of the driven unit.

17. In a driving means for car axle driven generators, and in combination with a car underframe and a wheel truck and an axle mounted on the truck, a drive gear unit mounted on the wheel truck to move longitudinally of the car, a tension device connected to said drive gear unit and to the truck frame, said drive gear unit embodying geared elements, a balanced double belt drive connection between the axle and drive unit, a generator mounted on the underframe transversely of the car, a driven unit directly coupled to the generator and embodying geared elements, and a flexible driving connection between the driving and driven units.

18. In a driving means for car axle driven generators, and in combination with a car underframe and a wheel truck and an axle mounted on the truck, a drive gear unit embodying geared primary and secondary shafts, a pivoted support for said unit mounting the same on the truck for reciprocating movement in a substantially horizontal plane toward and from the axle, a tension device connected to said unit and to the truck frame, a balanced double belt drive connection between the axle and the primary shaft of said unit, a generator mounted on the car underframe, a driven gear unit coupled to the generator, and a drive connection between the secondary shaft of the drive unit and the driven unit.

19. In a driving means for car axle driven generators, and in combination with a car underframe and a wheel truck and an axle mounted on the truck, a drive gear unit mounted on the truck and embodying geared primary and secondary shafts, a pivotal support for said unit mounting the same on the truck for reciprocating movement in a substantially horizontal plane toward and from the axle, a tension device connected to said unit and to the truck frame, a balanced double belt drive connection between the axle and the primary shaft of said unit, a generator mounted on the car underframe, a driven unit coupled to the generator, and a transmission shaft comprising telescopically coupled sections respectively connected to the secondary shaft of the drive unit and the driven unit.

20. In a driving means for car axle driven generators, and in combination with a car underframe and a wheel truck and an axle mounted on the truck, a drive gear unit mounted on the truck and embodying geared primary and secondary shafts, a pivotal support for said unit mounting the same on the truck for reciprocating movement in a substantially horizontal plane toward and from the axle, a tension device connected to said unit and to the truck frame, a balanced double belt drive connection between the axle and the primary shaft of said unit, a generator mounted on the car underframe, a driven unit coupled to the generator, and a drive connection between the secondary shaft of the drive unit and the driven unit.

21. In a driving means for car axle driven generators, and in combination with a car underframe and a wheel truck and an axle mounted on the truck, a driven gear unit mounted on the truck and embodying geared primary and secondary shafts, a pivotal support for said unit mounting the same on the truck for reciprocating movement in a substantially horizontal plane toward and from the axle, a tension device connected to said unit and to the truck frame, a balanced double belt drive connection between the axle and the primary shaft of said unit, a generator mounted on the car underframe, a driven gear unit coupled to the generator, and a drive connection between the secondary shaft of the drive unit and the driven unit.

22. In a driving means for car axle driven generators, and in combination with a car underframe and a wheel truck and an axle mounted on the truck, a drive gear unit mounted on the truck and embodying geared primary and secondary shafts, a pivotal support for said unit mounting the same on the truck for reciprocating movement in a substantially horizontal plane toward and from the axle, a tension device connected to said unit and to the truck frame, a balanced double belt drive connection between the axle and the primary shaft of said unit, a generator mounted on the car underframe, a driven gear unit coupled to the generator, and a transmission shaft comprising telescopically coupled sections respectively connected to the secondary shaft of the drive unit and to the driven unit.

23. In a driving means for car axle driven generators, and in combination with a car underframe and a wheel truck and an axle mounted on the truck, a driven gear unit mounted on the truck and embodying geared primary and secondary shafts, a pivotal support for said unit mounting the same on the truck for reciprocating movement in a substantially horizontal plane toward and from the axle, a tension device connected to said unit and to the truck frame, a balanced double belt drive connection between the axle and the primary shaft of said unit, a generator mounted on the car underframe, a driven unit coupled to the generator, and a drive connection between the secondary shaft of the drive unit and the driven unit.

24. In a driving means for car axle driven generators, and in combination with a car underframe and a wheel truck and an axle mounted on the truck, a drive gear unit, a pivotal support reciprocably mounting said unit on the truck frame, a tension device connected to the drive gear unit and to the truck frame, said drive unit embodying geared elements, a balanced double belt drive connection between the axle and drive unit, a generator mounted on the underframe, a driven unit coupled to the generator and embodying geared elements, and a flexible driving connection between the driving and driven units.

25. In a driving means for car axle driven generators, and in combination with a car underframe and a wheel truck having an end sill and an axle mounted on the truck, a support mounted on the outer side of said sill, a drive gear unit arranged on the outer side of the end sill and above said support, link connections extending upwardly from the support and between the same and the drive gear unit and supporting said drive gear unit for reciprocating movements toward and from the end sill, a tension device arranged above the horizontal plane of the drive gear unit and connected to said drive gear unit and to the truck frame at a point inside said end sill, said drive unit embodying geared elements, a belt drive connection between the axle and drive gear unit, a generator mounted on the underframe, a driven unit coupled to the generator, and a flexible driving connection between the driving and driven units including a shaft embodying sections telescopically connected to each other and universally jointed to the driving and driven units.

26. In driving means for car axle driven generators, and in combination with a car underframe, a wheel truck and an axle mounted on the truck, a drive shaft, a housing for said drive shaft mounted on the truck to swing on a horizontal transverse axis longitudinally of the car, a tension device connected to said housing and to the truck frame, a generator mounted on the car underframe, a plural balanced belt drive connection between the truck axle and the drive shaft, a driven shaft coupled to the generator, transmission gearing for driving the driven shaft, and a flexible transmission shaft between the drive shaft and gearing.

27. In driving means for car axle driven generators, and in combination with a car underframe, a wheel truck and an axle mounted on the truck, a drive unit including a housing having a drive shaft mounted therein, an underslung support for said housing mounted on the truck and on which said housing is pivotally mounted to swing longitudinally of the car, a tension device connected to the truck frame and to the housing above the plane of the shaft, said shaft having its ends extending beyond opposite sides of the housing, a balanced plural belt drive connection between the respective ends of the shaft and the axle, a generator mounted on the car underframe, a driven shaft coupled to the generator, and universally jointed transmission means between the drive shaft and the driven shaft.

28. In driving means for car axle driven generators, and in combination with a car underframe, a wheel truck and an axle mounted on the truck, a drive shaft, a housing for said shaft mounted on the truck to swing on a horizontal transverse axis longitudinally of the car, a tension device connected to the truck frame and to said housing, a balanced plural belt drive connection between the axle and drive shaft, a driven shaft, a generator mounted on the car underframe and driven by the driven shaft, and a flexible drive connection between the driven shaft and drive shaft.

29. In a driving means for car axle driven generators, and in combination with a car underframe and a wheel truck having an end sill, and an axle mounted on the truck, a support carried by and arranged below the plane of the end sill, a gear unit including a horizontally disposed drive shaft, oppositely disposed pairs of links disposed on opposite sides of the drive shaft and forming a pivotal connection between the support and the gear unit, a tension device connected to the truck frame and to the gear unit above the plane of the support, a plurality of parallel driving belts connecting the axle and drive shaft, a generator mounted on the car underframe, a horizontally disposed driven shaft, gearing including a transmission shaft arranged in the horizontal plane of and coupling the driving and driven shafts, and a flexible drive connection between the driven shaft and generator.

30. In a driving means for car axle driven generators, and in combination with a car underframe, a wheel truck having an end sill, and an axle mounted on the truck, a support mounted on the truck and disposed below the horizontal plane of said end sill, a drive gear unit disposed above the support, pivotal means between the support and drive gear unit mounting said drive gear unit for shifting movements longitudinally of the car, a balanced tension device connected to the truck frame and to the drive gear unit above the plane of the support and the pivotal means between the same and the drive gear unit and acting on said gear unit to yieldingly control its shifting movements, said drive unit embodying geared elements, a non-rigid drive connection between the axle and geared elements of the drive unit having capability of a compensating movement under car shocks and jars and the inertia of the gear elements and generator armature to prevent injury thereto by such shocks and jars and inertia actions, a generator mounted on the underframe transversely of the car, a driven unit directly coupled to the generator and embodying geared elements, and a driving connection between the driving and driven elements.

31. In a driving means for car axle driven generators, and in combination with a car underframe, a wheel truck having an end sill, and an axle mounted on the truck, a support mounted on the truck and disposed below the horizontal plane of said end sill, a drive gear unit disposed above the support, pivotal means between the support and drive gear unit mounting said drive gear unit for shifting movements longitudinally of the car, a balanced tension device connected to the truck frame and to the drive gear unit above the plane of the support and the pivotal means between the same and the drive gear unit and acting on said drive gear unit for controlling its longitudinal shifting movements, said drive unit embodying geared elements, a non-rigid drive connection between the axle and geared elements of the drive unit having capability of a compensating movement under car shocks and jars and the inertia of the geared elements and generator armature to prevent injury thereto by such shocks and inertia actions, a generator mounted on the underframe transversely of the car, a driven unit coupled to the generator and embodying geared elements, and a flexible driving connection between the driving and driven units and comprising a shaft embodying sections telescopically connected to each other and universally jointed to the geared elements of the driving and driven units.

32. In a driving means for car axle driven generators, and in combination with a car underframe and a wheel truck having an end sill and an axle mounted on the truck, a support on the truck disposed below the horizontal plane of the end sill, a drive gear unit disposed above said support, means between and mounting the drive gear unit on the support to move longitudinally of the car, a tension device connected to the truck frame and to the drive gear unit above the plane of the support and said mounting means, said drive unit embodying geared elements, a drive connection between the axle and drive unit, a generator mounted on the underframe transversely of the car, a driven unit embodying geared driven and driving elements, a driving connection between the driving element of the driven unit and the generator, and a driving connection between the driving and driven units.

33. In a driving means for car axle driven generators, and in combination with a car underframe and a wheel truck and an axle mounted on the truck, a drive gear unit supported from the truck to move longitudinally of the car, a tension device connected to the truck frame and to said drive gear unit, said drive unit embodying geared elements, a balanced double drive connection between the axle and geared elements of the drive unit, a generator mounted on the underframe transversely of the car, a driven unit directly coupled to the generator and embodying geared elements, and a flexible driving connection between the driving and driven units.

34. In a driving means for car axle driven generators, and in combination with a car underframe and a wheel truck and an axle mounted on the truck, a drive gear unit supported from the truck frame to move longitudinally of the car, a tension device connected to the truck frame and to said drive gear unit, said drive unit embodying geared elements, a balanced double drive connection between the axle and geared elements of the drive unit, a generator mounted on the underframe transversely of the car, a driven unit directly coupled to the generator and embodying geared elements, and a flexible driving connection between the driving and driven units and comprising a shaft embodying sections telescopically connected to each other and universally jointed to the geared elements of the driving and driven units.

35. In a driving means for car axle driven generators, and in combination with a car underframe and a wheel truck having an end sill and an axle mounted on the truck, a support on the truck disposed below the horizontal plane of the end sill, a drive gear unit pivotally mounted on the support to move longitudinally of the car, a tension device connected to the truck frame and to said drive gear unit above the horizontal plane of said support and mounting means, said drive unit embodying geared elements, a non-rigid drive connection between the axle and geared elements of the drive unit having capacity of a compensating movement under car shocks and jars and the inertia of the gear elements and generator armature to prevent injury thereto by such shocks and jars and inertia actions, a generator mounted on the underframe transversely of the car, a driven unit embodying geared driven and driving elements, a driving connection between the driving element of the driven unit and the generator, and a flexible driving connection between the driving unit and the driven element of the driven unit.

WILLIAM B. WHITSITT.